United States Patent [19]

Hirashima

[11] Patent Number: 4,833,710
[45] Date of Patent: May 23, 1989

[54] PAY TELEVISION SYSTEM

[75] Inventor: Masayoshi Hirashima, Ibaraki, Japan

[73] Assignee: Matsushita Electric Industrial Co., Ltd., Kadoma, Japan

[21] Appl. No.: 127,593

[22] Filed: Dec. 3, 1987

Related U.S. Application Data

[63] Continuation of Ser. No. 701,283, Feb. 12, 1985, abandoned.

[30] Foreign Application Priority Data

Feb. 15, 1984 [JP] Japan .................................. 59-26333
Feb. 15, 1984 [JP] Japan .................................. 59-26335
Feb. 15, 1984 [JP] Japan .................................. 59-26336
Feb. 15, 1984 [JP] Japan .................................. 59-26338

[51] Int. Cl.$^4$ ...................... H04N 7/167; H04N 7/16; H04N 7/10
[52] U.S. Cl. ........................................ 380/20; 380/10; 380/16; 358/84; 358/86; 455/2
[58] Field of Search ............... 380/10, 16, 20; 358/84, 358/86; 455/2

[56] References Cited

U.S. PATENT DOCUMENTS

| | | | |
|---|---|---|---|
| 3,508,005 | 4/1970 | Hamburger | 358/84 |
| 3,760,160 | 9/1971 | Gieringer et al. | 235/378 |
| 3,885,089 | 5/1975 | Callais et al. | 380/20 |
| 4,258,386 | 3/1981 | Cheung | 358/84 |
| 4,354,201 | 10/1982 | Sechet et al. | 380/20 |
| 4,388,643 | 6/1983 | Aminetzah | 358/114 |
| 4,417,101 | 11/1983 | Serres et al. | 235/378 |
| 4,430,669 | 2/1984 | Cheung . | |
| 4,484,027 | 11/1984 | Lee et al. | 358/122 |
| 4,484,217 | 11/1984 | Block et al. | 358/122 |
| 4,494,143 | 1/1985 | Lovick et al. | 380/20 |
| 4,531,020 | 7/1985 | Wechselberger et al. | 358/122 |
| 4,599,647 | 7/1986 | George et al. | 380/20 |
| 4,696,034 | 9/1987 | Wiedemer | 380/16 |

FOREIGN PATENT DOCUMENTS

| | | |
|---|---|---|
| 633737 | 1/1962 | Canada . |
| 787004 | 6/1968 | Canada . |
| 814071 | 5/1969 | Canada . |
| 0128555 | 12/1984 | European Pat. Off. . |
| WO83/04154 | 11/1983 | PCT Int'l Appl. . |

Primary Examiner—Stephen C. Buczinski
Assistant Examiner—Linda J. Wallace
Attorney, Agent, or Firm—Wenderoth, Lind & Ponack

[57] ABSTRACT

This invention, relating to a unidirectional television system such as satellite television broadcasting system, is intended to transmit and receive the charging information corresponding to the content of the program being transmitted in the digital form at certain time intervals, and account the amount by a charging amount accounting means built in the receiver from said information and the time of receiving the television program, write the charge data proportional to the amount in a memory, read out the charge data in the memory when necessary, and display it on a display means.

13 Claims, 9 Drawing Sheets

PAY TELEVISION SYSTEM

This application is a continuation of now abandoned application Ser. No. 701,283, filed Feb. 12, 1985.

BACKGROUND OF THE INVENTION

1. Field of the Invention

This invention relates to a pay television system of using unidirectional television signals as in television broadcasting using a broadcasting satellite, and more particularly to a charging system of its receiving charge.

2. Description of the Prior Art

In a unidirectional signal transmisstion and receiving system as in a satellite television broadcasting, to collect a receiving charge at a terminal receiver as in the case of receiving a charged program of CATV, it is necessary to have the receiving charge paid by the subscribers on a 'pay later' basis, and to disable the terminal receiver of the subscriber who does not pay.

This is practiced in a pay television of bidirettional CATV system.

In the case of CATV system, however, subscribers must apply for viewing a specivied pay television program to the transmission center by the up line of the bidirectional communication lines or by telephone, and such method cannot be employed in the unidirectional system such as satellite broadcasting. And in this method, when many subscribers apply for a same program at the same time to the center, an overflow of the capacity of the telephone line or overflow of the processing capacity at the receiving side occurred.

An example of such conventioanl composition is shown in FIG. 1, in which numeral 1 is a computer center of a CATV station for controlling the record of payment of receiving charge by the subscribers, selection of programs to be transmitted according to the request of the subscribers, compilation of control codes, and others while a CATV center 2 transmits the video signals prepared by VTR, film or at the studio according to its computer commands, together with said control codes. Reference number 3A is a head-end for signal transmission, and sends out plural television signals from the CATV center 2 in a form of, for example, mid-band television signals of VHF. Reference number 3B is a buffer circuit for receiving up signals from each receiving terminal, and the head-end 3A and tuner/converter 4 at the receiving terminal side of CATV and buffer circuit 3B are connected by a same cable or different cables. Or a telephone line may be used instead of the cable for up signal from the tuner/converter 4 to the buffer circuit 3B.

Numeral 4 is a terminal side tuner or converter for frequency conversion of mid-band signals into a first-channel (or second-channel) signals of VHF, and one channel is CATV signals of the mid-band is converted into one channel of VHF by the command from a key pad 5. Incidentally, when the CATV signal is scrambled, it is once converted into a base band signal, and descrambled, then converted into an RF signal again to be delivered as signal of one channel of VHF.

Numeral 6 is a television receiver for VHF band reception. The viewer applies for a desired program (charged) to the computer center 1 by operating the key pad 5 or through telephone set 7. At the center 1, the charge is set at every terminal. Or when sending out signals by scrambling, the descrambling key code is transmitted in the sequence of center computer 1, CATV center 2, head-end 3, and converter/tuner 4. At the tuner/converter 4, the received signals are descrambled by using this key code, and NTSC video signals of normal picture are reproduced, and are converted into one channel of VHF to be supplied into the television receiver 6. There are multiple tuners/converters 4 to telephone sets 7 which are terminal stations, and a central intervenes between the telephone set 7 and telephone interface 8. At the telephone interface 8, generally, an operator hears the request from each terminal, and it is converted into the format of input to the center computer 1. This is an example of the prior art.

OBJECT OF THE INVENTION

This invention is to present a system to realize a pay television system in a unidirectional television signal transmission such as satellite television broadcasting system. More particularly, it is intended to present a pay television system capable of effectively preventing illegal access to the program having hard-to-read key codes.

BRIEF OF THE INVENTION

This invention, relating to a unidirectional television system such as satellite television broadcasting system, is intended to transmit and receive the chargig information corresponding to the content of the program being transmitted in the digital form at certain time intervals, and account the amount by a charging amount accounting means built in the receiver from said information and the time of receiving the television program, write the charge data proportional to the amount in a memory, read out the charge data in the memory when necessary, and display it on a display means.

Also in this invention, when the charge information of each terminal is sent from the television program transmission side at every terminal, this charge information is transmitted to a memory, and is compared with the charge information preliminarily stored in the memory, and only when the both amounts agree or the charge sent from the transmission side is larger than the charge in the memory, a new key code sent from the transmission side is stored so that the television program may be received.

Moreover, in this invention, the memory is divided into three sections, and the charge information proportional to the receiving time of every program is stored in the first memory, the content of the first memory is added to the content of the second memory at every termination of reception of a pay program, such as when the program ends, the power is cut off, or the channel is changed, and the content of the second memory is transferred and store.d in the third memory when receiving the charge display indication code sent out from the transmission side at every time interval.

When receiving the data corresponding to the paid charge individually sent from each receiver from the transmission side, the data is compared with the content of the first or second memory, when the two are equal or the content of the second or third memory is smaller than the received data, the contents of the second and third memories are cleared, and when the received data is smaller than the content of the second or third memory, the balance is stored in the second and third memories, and the amount of this balance is displayed.

Furthermore, in this invention, the memory for storing the charge information, and the memory for storing the key code signal for descrambling the scrambled video signal and sound signal are separately provided. As the key code signal memory, the first memory for storing the presently effective key code and the second memory for storing the key code signal which becomes effective in the future are provided, and by storing the key code signals into them, the key code signals continuously sent from the transmission side are written once into the memory. Besides, there is another memory for storing flags indicating the rewriting data and the type of charge information at that time according to the charge information of individual terminals as the content of the charge information memory is sent from the transmission side, and by the key code changeover signal from the second memory, the transfer of the content of the second memory into the first memory is stored in this third memory.

Still more, in this invention, while the individual addresses assigned to every terminal are scrambled by a first scrambling method to be stored in the memory, the information by descrambling the terminal key code scrambled a second scrambling method is scrambled by the first scrambling method and stored in the memory, and the program for descrambling this first scrambling method is stored in the memory, such as ROM, on the chip of a microprocessor for main control.

Eventually, key codes may be transmitted in different scrambling method to different terminals, so that illegal access to pay program may be effective prevented.

BRIEF DESCRIPTION OF THE DRAWINGS

FIG. 10 is a chart of signals used in the same receiver.

DESCRIPTION OF THE PREFERRED EMBODIMENTS

The embodiments of the present invention are further described below in conjunction of the accompanying drawings.

Figure 1:
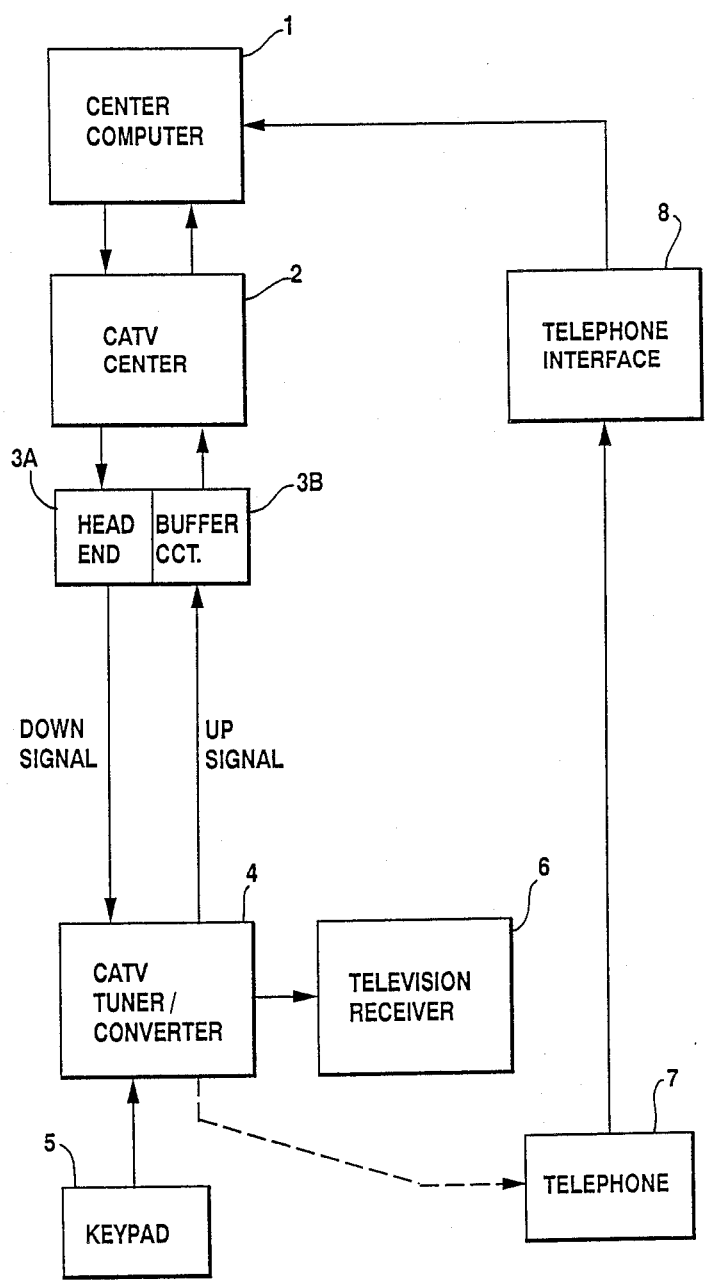
FIG. 1 is a block diagram of a pay television system in one example of the prior art.
Figure 2:
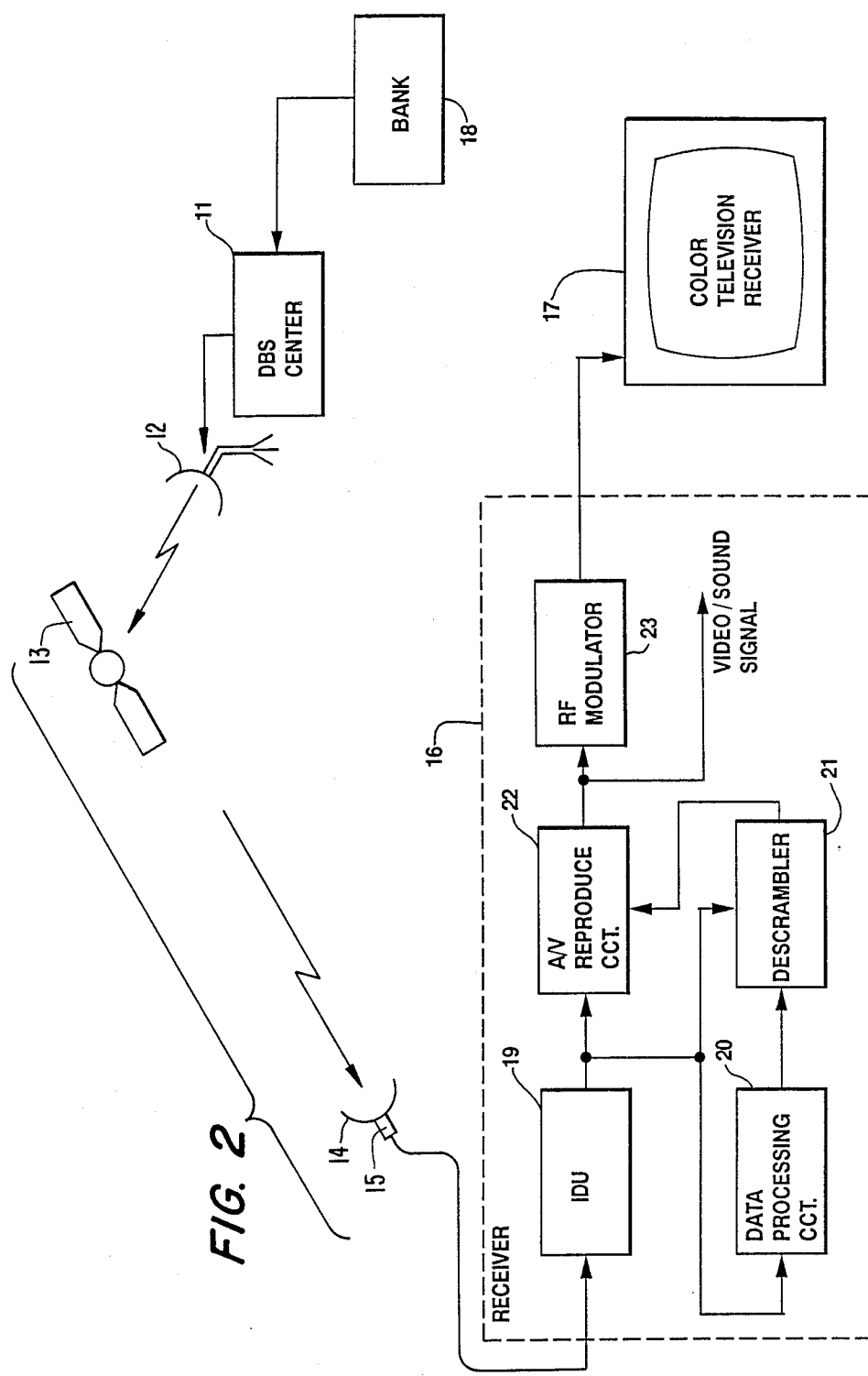
FIG. 2 is a block diagram of a satellite television broadcasting system for realizing the pay television system of this invention.

One of the embodiments of the present invention is shown in FIG. 2, in which numeral 11 denotes a transmission center of satellite broadcast, being generally called a DBS center. Numeral 12 is a large-sized parabolic antenna for sending out signals to a geostationary satellite 13 which is a repeater for retransmitting the signal sent from the earth back to the earth. Numeral 14 is a receiving antenna installed at a receiver terminal on the ground. Numeral 15 is a low noise converter, and it converts, for example, the television broadcast signal of 12 GHz ban received by the antenna 14 into one of 1 GHz band, and transmits it to a receiver 16 as a first IF signal.

Numeral 19 in the receiver 16 is called an IF demodulator unit (IDU), and it converts, for example, the first IF input of 1 GHz band into a second IF signal of 400 MHz, and amplifies and detects it, and delivers a base band signal. Numeral 20 is a data processing circuit for picking up digital signals from the output, processing and feeding to a descrambler 21.

Figure 3:
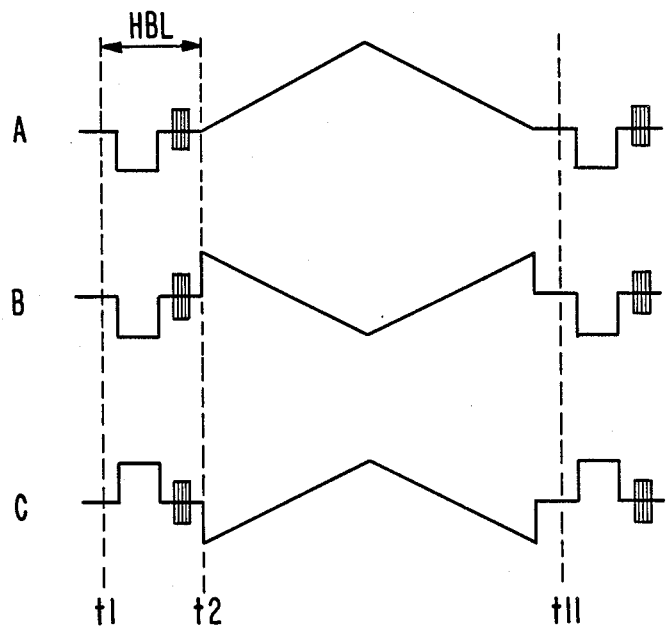
FIG. 3 is a waveform diagram of video signal in the same system.

Suppose, for instance, that the video signal is scrambled by synchronism shifting and video component random inversion while the sound is scrambled by digital sound with the bit arrangement changed at random. When the output of the IDU 19 is directly projected on the CRT of the color television receiver 17, the luminance is inverted on the screen, and the horizontal and vertical deflections cannot be synchronized, so that the picture is destroyed and unintelligible. Or when the sound is directly delivered from the speaker, it is a mere noise. Accordingly, the descrambler 21 changes over inversion or noninversion of the picture depending on the output from the data processing circuit 20, and the bits of the digital signal of sound are rearranged to descramble to normal picture and sound. At an A/V reproducing circuit 22, only the horizontal blanking period of the output from the IDU 19, that is, only the portion $t_1$ to $t_2$ in FIG. 3 B is varied in the DC level, and is synthesized with the portion $t_2$ to $t_{11}$ of the output of descrambler 21 (FIG. 3 C), and the original video signal (FIG. 3 A) is reproduced, and the digital sound signal of the output of descrambler 21 is converted to an analog sound signal.

The output of this A/V reproducing circuit 22 is converted into a signal of a proper channel of VHF band in an RF modulator 23, and when its output is fed to the antenna input of an ordinary color television receiver 17, the scrambled picture and sound are received in a normal descrambled state.

Such program to be received by returning scrambled picture and sound to normal picture and sound is often a charged program. If charged, the mount of charge is indicated by the digital signal for control superposed in the vertical blanking period (VBL) of the video signal of the program, and the charge is recorded in the memory of the receiver. Generally, when a certain program is received for 2 to 10 minutes or more, the charge for the entire program will be billed.

As a method of payment of the charge, for example, a card reader is attached to the data processing circuit 20 in FIG. 2, and a purchased card (such as a season ticket) is inserted into it, and the control signal for descrambling to the descrambler 21 is sent out from the data processing circuit 20 only for the time corresponding to the paid amount. Or, in other method, the charge is prepaid to a bank 18, and according to this prepaid charge data, a code expressing the paid-in charge is sent from the DBS center 11 to each terminal (where an address is provided individually) through the geostationary satellite 13, and its charge code is written in the memory at the terminal and the charge code in the memory is changed (decreased) every time charge program is received at the terminal, and when the remainder becomes zero, the charge is paid again to the bank 18 and the same procedure is repeated.

Figure 4:
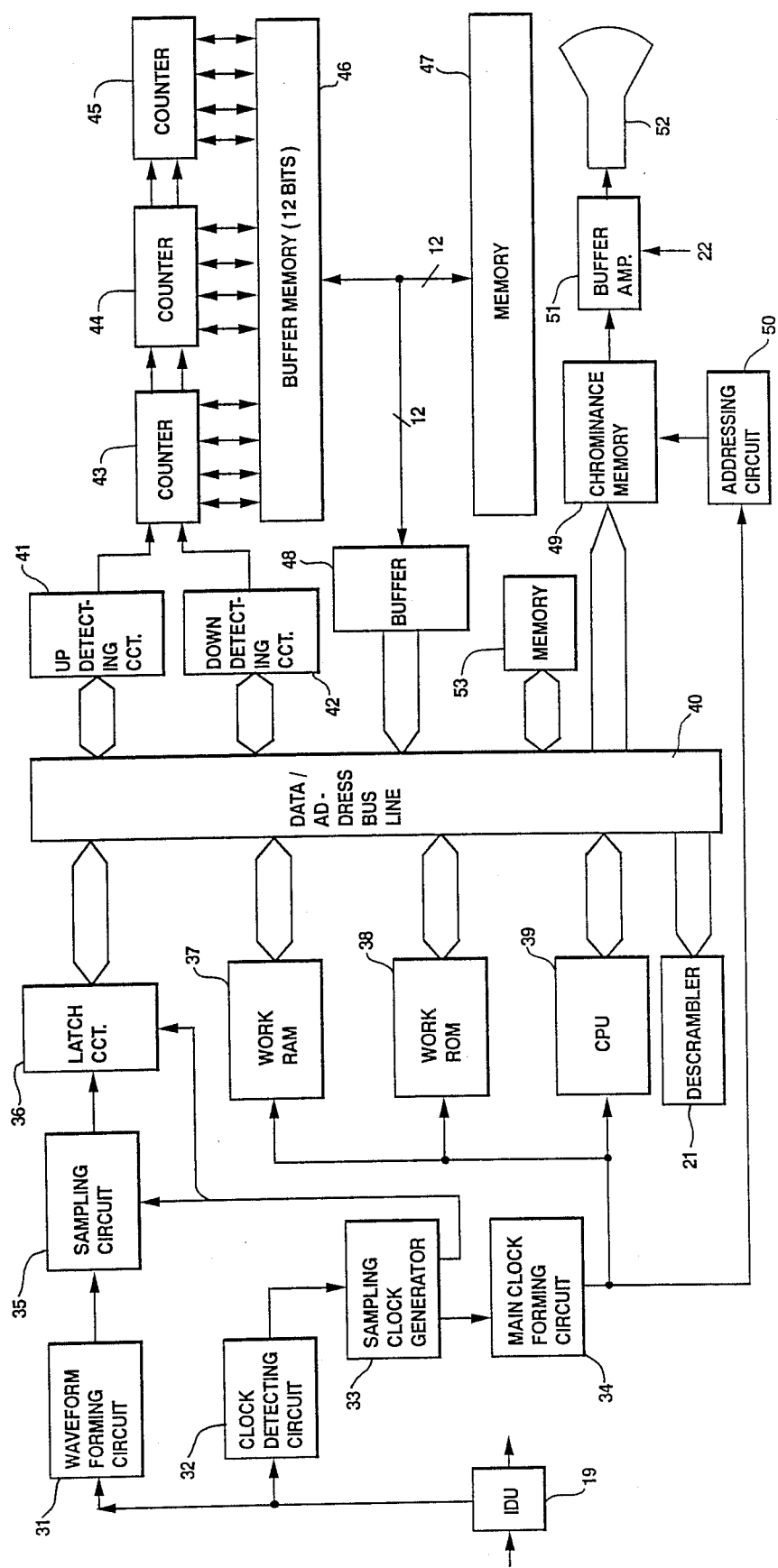
FIG. 4 is a block diagram of a receiver used in a pay television system in one of the embodiments of this invention.

More specifically, the content of the data processing circuit 20 in FIG. 2 is composed as indicated by numerals 31 to 50 in FIG. 4, and when a charged program is received, the charge corresponding to the receiving time is calculated at the terminal side according to the charge data superposed in the VBL period of the video signal and is written into the nonvolatile memory, and the subscriber pays the viewing charge equal to or more than the amount received within the month to the bank every month. At the center, the signal indicating the paid-in amount is sent to each terminal (at every address) from the DBS center 11 by polling, and at the individual terminal the content of the memory 47 is decreased by the portion of the amount indicated by that amount signal, and the receiver is controlled so that charged programs may not be received from the next month unless the content of the memory 47 is canceled to zero.

Figure 5:
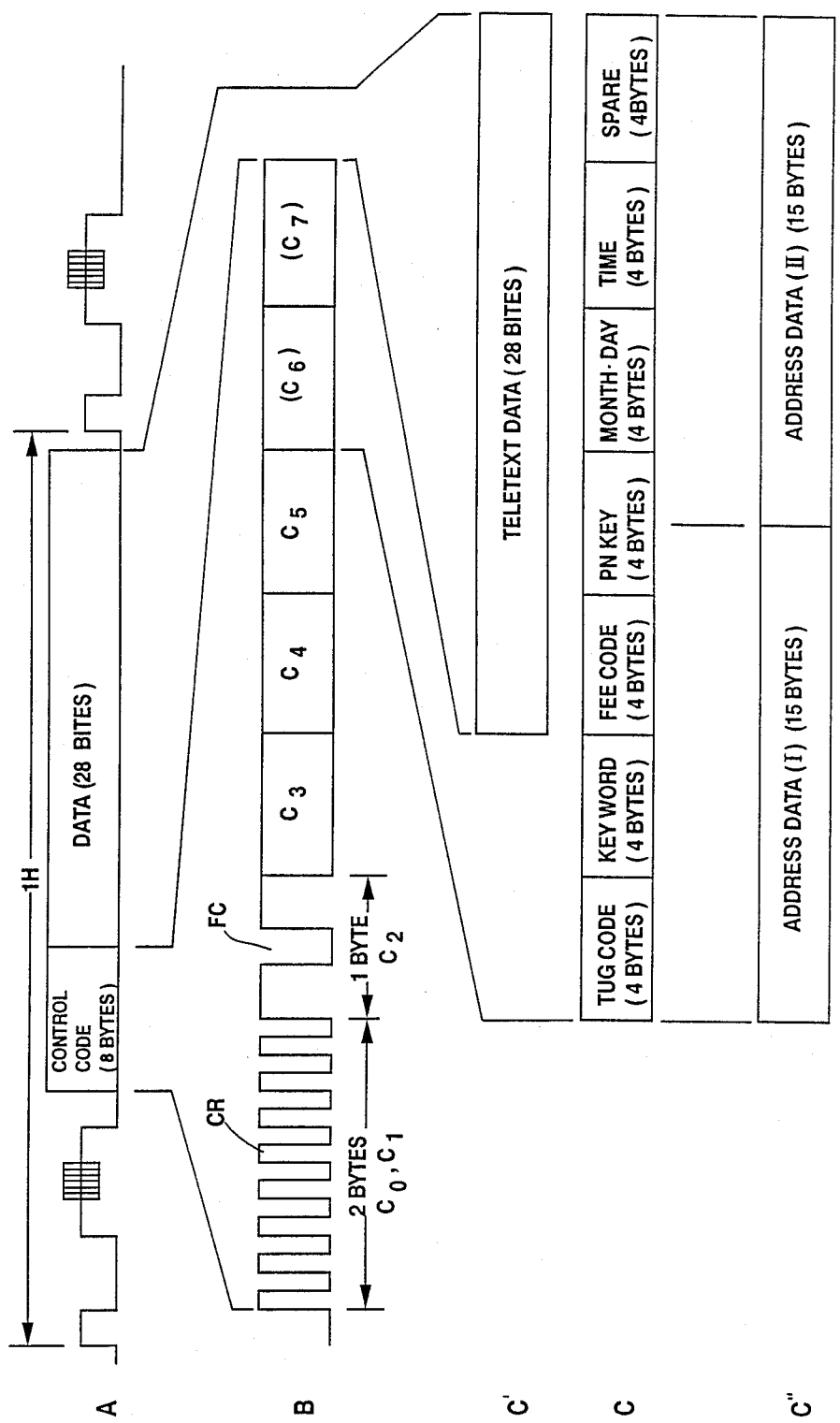
FIGS. 5 and 6 are waveform diagrams of signals used in the same receiver.

In FIG. 4, numeral 31 is a waveform forming circuit which shapes the waveform of data signal, such as FIG. 5 A signal, superposed in the VBL period in the output of the IDU 19, and composes a pulse waveform signal as shown in FIG. 5 B. Numeral 32 is a clock detecting circuit which, using iterative clock run signals CR of "1" and "0" signals of 2 bytes in the head portion of FIG. 5 B, reproduces clock pulses synchronized with them, detects a framing code at the 8th bit of framing code signal FC within the reception signal to establish frame synchronizing, and synchronizes the sampling clock-generated in a sampling clock generating circuit 33 to the reception signal. Numeral 33 is a circuit to form a sampling clock of thus controlled appropriate phase. Its output is divided by a main clock forming circuit 34 to compose a main clock to drive the work RAM 37, work ROM 38, center processing unit (CPU) 39, etc.

The clock synchronized with each bit of the reception signal from the output of the sampling clock generating circuit 33 is fed to the sampling circuit 35, and each bit of the reception signal is sampled. The pulse width of each bit of reception signal is about 175 ns at $\frac{2}{3}$ fsc, and in this cycle time it is difficult to operate the work RAM 37 to CPU 39 in FIG. 4. When an 8-bit microprocessor is used as the CPU 39, it is convenient to handle the reception data by 8-bit parallel signals. Therefore, as the sampling circuit 35, a shift register of series input-parallel output type such as SN74LS164 is suited. When its output is stored in a latch circuit 36 at every 8 bits on the basis of the 8th bit of the framing code, the output is an 8-bit parallel signal, and varies in the cycle time of $8 \times 5/5f_{sc}1.4$ μs. This cycle time is suited to operation of each circuit. This output is connected to a bus line 40.

Numeral 37 is a work RAM of CPU 39, and 38 is a work ROM of CPU 39. The CPU 39 is an 8-bit microprocessor (for example, MB6809E).

Referring now to control codes $C_0$, $C_1$ to $C_7$ in the reception signal B in FIG. 5, $C_0$ and $C_1$ are iterative clock run signals CR of 1 and 0, and $C_2$ is a framing code signa; of 11100101. $C_3$ is composed of information of 4 bits, humming check code of 3 bits, and parity bit of 1 bit, $C_4$ and subsequently data are all in the same composition in every byte. The contents of information of $C_3$ and $C_4$ are compiled Table 1, in which only three kinds necessary for explanation are shown. Actually, more than several kinds can be considered. Similarly, the contents of information of 4 bits of $C_5$ are give in Table 2.

TABLE 1

| L S B | M S B | |
|---|---|---|
| 00000000 | | Dummy packet |

TABLE 1-continued

| L S B | M S B | |
|---|---|---|
| 10000000 | | Teletext |
| 01000000 | | DBS signal |
| 11000000 | | |
| . . . | | Spare |
| 11111111 | | |
| $C_3$ | $C_4$ | |

TABLE 2

| L S B | M S B | |
|---|---|---|
| 0000 | | Dummy |
| 1000 | | Program data |
| 0100 | | Scrambled data |
| 1100 | | Address data |
| 0010 | | |
| . . . | | Spare |
| 1111 | | |
| $C_5$ | | |

In the case of satellite televison broadcasting, is used in 8 bits of $C_3$, $C_4$, and any one of 1000, 0100, 1100 is used in $C_5$.

When the data of 28 bytes in the recpetion signal as in FIG. 5 A is program data, an example is shown in FIG. 5 C. In its beginning portion, the number indicating the kind of program is expressed in a four-digit BCD code in 4 bytes as the tag-code. Therefore, 9999 kinds can be specifed.

The next keyword code which is changed every month, and it is indispensable for descrambling the signals received at the terminal side, and the reception at the unpaid terminal is stopped by stopping the transmission of this key code from the DBS center. For example, the payment data is set on the 20th day every month, and the key code is changed from the first day of each month. Since the receiver 16 in FIG. 2 is always energized and it is operating unless the power cord is unplugged.

The next charge code contains a four-digit BCD information in 4 bytes. The charge code varies with the passing of the time, and the charge proportional to the program viewing time (the time being displayed on the CRT) is recorded. Its content is described in details below.

The next PN key is a four-byte (or 16-bit as information) expression of the initial value of the PN code for descrambling the scrambled signals. Prevetion of illegal access by PN key is a first measure of security. The next date code, comprising 2 digits of BCD for the month and 2 digits of BCD for the day, uses 4 digits of BCD, that is, information bit×4 in the four bytes. The time also comprises of 2 digits of BCD for the hour and 2 digits of BCD for the minute. The content is composed as shown above when the data is program data packet ($C_5$ is 1).

Meanwhile, when $C_5$ is 2 (00100) and the scrambled data packet is sent out, all of 28 bytes (of which 14 bytes are information data) are data as shown in C', and 14 bytes of the information portion of them are written into specified positions of the work RAM. This data differs in the content in very program. Various contents and kinds of scrambled data may be considered, but they are ommitted in this description.

Or when $C_5$ is 3 (0011), the address data packet is sent in 28 bytes as shown in C''. This address data packet includes, as shown in FIG. 5 C'', the address indicating two terminals within one packet. This C' is magnified in FIG. 6, and its first half 14 bytes are magnified in FIG. 6 D. The information bits of the first half 7 bytes of D are 28 bits of the portion of 7 bytes, and $2^{28}$, or about 268 million, terminal address can be distinguished.

Figure 6:
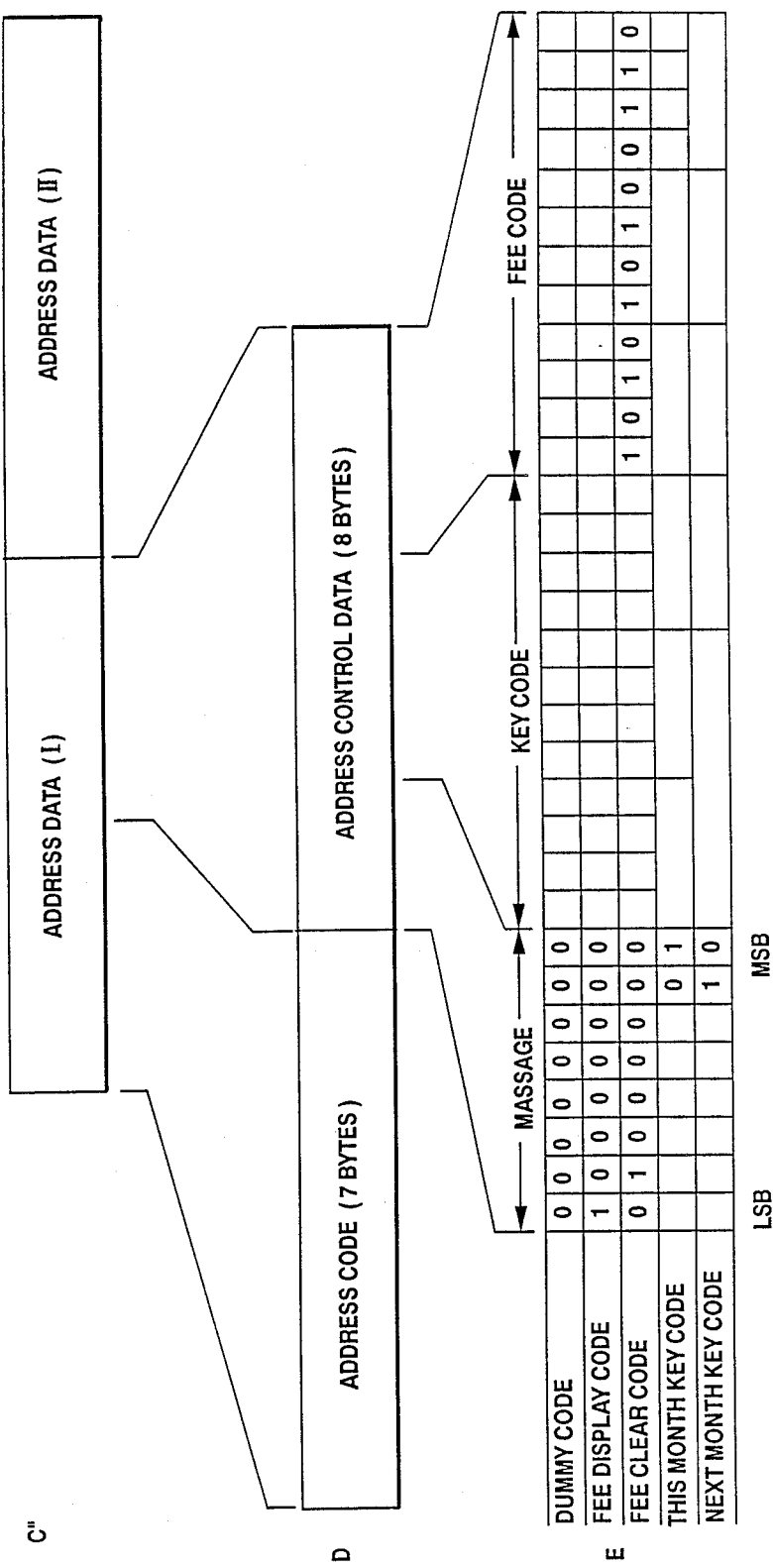

The latter hald 8 bytes may be divided as shown in FIG. 6 E, in which E refers only the information bits, that is, 32 bits of the portion of 8 bytes. The first two bytes of E (the first one byte in the case of information only) are for sending the directions from the DBS center to the terminals in the maximum of 255 kinds, and, for example, when "1" is specified as in FIG. 6, the total amount of the pay television viewed at the specific terminal up to that point is indicated. When the amount is given at increments of 25 cents each, up to 210 dollars can be specified in the right-hand 12 bits in FIG. 6 (the information of 1.5 bytes in the data area of 3 bytes). Therefore, when clearing the charge, the code of amount (1024 dollars 75 cents at maximum) is sent from very terminal, while the amount paid by the subscriber to the bank is sent from the DBS center 11 to each terminal, so that the content in the amount memory 47 at the terminal is updated. If the amount of viewing the programs is written in the amount memory 47 in the unit of 25 cents, the amount sent from the DBS center 11 is subtracted from its content, and when the content in the amount memory 47 becomes zero, it is detected by the CPU 39, and the key code in FIG. 6 is read in. If the content in the amount memory 47 does not become zero, that is, if the paid-in amount is short, the key code is not taken in, so that the scrambled information (picture, sound) cannot be descrambled and viewed from the next month. The amount is written (that is, subtracted from) into the memory 47 once every month, and the charge data is sent from the DBS center 11 consecutively for about a week each at the end and beginning of a month. Therefore, if the power source of the receiver is cut off by mistake, when the power is connected even in a day within this two-week period, the paid charge can.be written into the amount memory 47 to cancel the content to zero, so that the key code may be read in. The key code, and entry of date, time, etc. into the amount memory 47 are written into a non-volatile memory 53 as in the case of writting into the amount memory 47 in FIG. 4. In the memory 53, the data writing data (time) into the amount memory 47 is written, and if the amount is paid twice or more by mistake, it is controlled so that the data may be written correctly into the amount memory 47 as the first time, second time, and so forth.

Referring then to key codes, a key code is composed of 12 bits, and represents a formula to determine the −1 PN series signals. For example, the key code is sent forth as 011000010001, the formula becomes $x^{11}+x^7+x^2+x=f(x)$. Or this polynominal may contain 11 bits or less, instead of 12 bits. Or the key code may contain 16 bits, and the message in FIG. 6 E may be decreased from 1 byte to 4 bits.

The actual operation is described below. When a terminal is purchased, all contents in the buffer circuit 46 in FIG. 4 are zero, and when the power is supplied to this terminal (suppose X), first the key code is taken in. If this terminal is purchased in the middle of a month, since periodic polling to all terminals is not effected by the DBS center 11, polling of the number of terminals installed on or around that day (for example, 10,000) is effected temporarily. As clear from FIG. 6, since two terminals can be polled by 1H (horizontal period), when 5H in the VBL period is assigned for polling, it results in 10 terminals/field=600/sec=36,000/min, which means polling of newly subscribed terminals can be effected within a minute. Therefore, a newly purchased terminal can take in the key code of the contemporary month within about 1 minute. When a terminal is installed at the end of a month, though the key code for the next month is periodically sent to all subscribers periodically, if, for example, half of 1H of 5H the VBL period is used for polling of key code of the month for new subscribers, it becomes $(36000/10)\times 3=10.800$ as evident from the explanation above, and polling of about 10,000 new subscribers can be finished in about 3 minutes. Supposing the total number of subscribers at this point to be 10 million, all subscribers can be polled in about 61 minutes.

By the way, this terminal X is given its own address in 28 bits. These 28 bits are, in order to prevent illegal access to charged programs, scattered about, for example, in the memory comprising 256 bits, or written in part of the work ROM 38 or in an independent chip so that a correct address may be obtained by operating the address code of 28 bits according to the keyword in FIG. 5 C. If, for example, operated by the keyword, it is necessary to receiver the packet of FIG. 5 C. Considering the data transmission efficiency, if superposing a same packet in all of 5H at a rate of once a second and sending out, the keyword is received within a second at the receiving side, and is written into the work RAM 37. This keyword has an information capacity of 16 bits. By operating the data after the keyword and other data according to the keyword and descrambling the scrambled data, a second means of security (prevention of illegal access) may be achieved.

After receiving the keyword, the packet in the form of FIG. 5 C'' is received, and 28 bits of the address of terminal X are searched. When the address data 28 bits being transmitted and the address 28 bits in the said work ROM 38 coincide, the eight bytes of FIG. 6 E are taken into the wor RAM 37. Since the content of the amount memory 47 at terminal X is zero, MSB of the message in FIG. 6 E and the bit of one position lower are seen according to the instruction from the CPU 39. Such program is assembled in the work ROM 38. The following explanation is given on the same principle, that is, the CPU 39 conforms to the program of work ROM 38.

Since the MSB is "1" in the middle of a month (the code should be-assigned so that other bits can be ignored), the 12 bits of the key code are taken into the work RAM 37, and sent to the nonvolatile memory 53 through the bus line and stored. Thereafter, by using this key code, the data of FIG. 5 C, C', C'' are descrambled.

If a received program is a charged one, the charge per unit time is indicated in the charge code. It is ideal for the charged program that the charge proportional to the received duration may be directly billed. As one of the methods, for example, suppose one 60-minute program costs 6 dollars, and 25 cents is charged for every 2.5 minutes. In this case, as the charge code, the content of the code is varied every 2.5 minutes, one bit (corresponding to 25 cents) is fed to the counters 43 to 45 every time the code is changed, and the pulses corresponding to the received time are counted. When the program end data (such as all "1" in charge code or spare code) is detected, or the receiving channel is changed, or the power source is cut off, the output of the counters 43 to 45 (indicating the multiples of 25 cents) is written into the amount memory 47 composed of nonvolatile memory through the buffer. The amount memory 47 is a nonvolatile memory including an adder, and has, for example, 12 bits. When the power source is cut off, the counter 43 to amount memory 47 are supported temporarily by the battery, and the data in counters 43 to 45 is written into the amount memory 47 through the buffer 46.

In other method, the viewing charge amount from start of a program till a specific time is sent in codes from the DBS center 11 every 2.5 minutes, and the balance of the first received charge code and the final one is written into the amount memory 47 at the terminal X. In this method, every time the charge code varies, the unit charge is calculated to detect how many multiples of 25 cents, and pulses corresponding to the number are supplied to the counter 43 to 45 through the up detection circuit 41 to count them up.

In either method, at every passing of the time corresponding to 25 cents, the counters 43 to 45 are counted up every bit through the up detection circuit 41.

Figure 7:
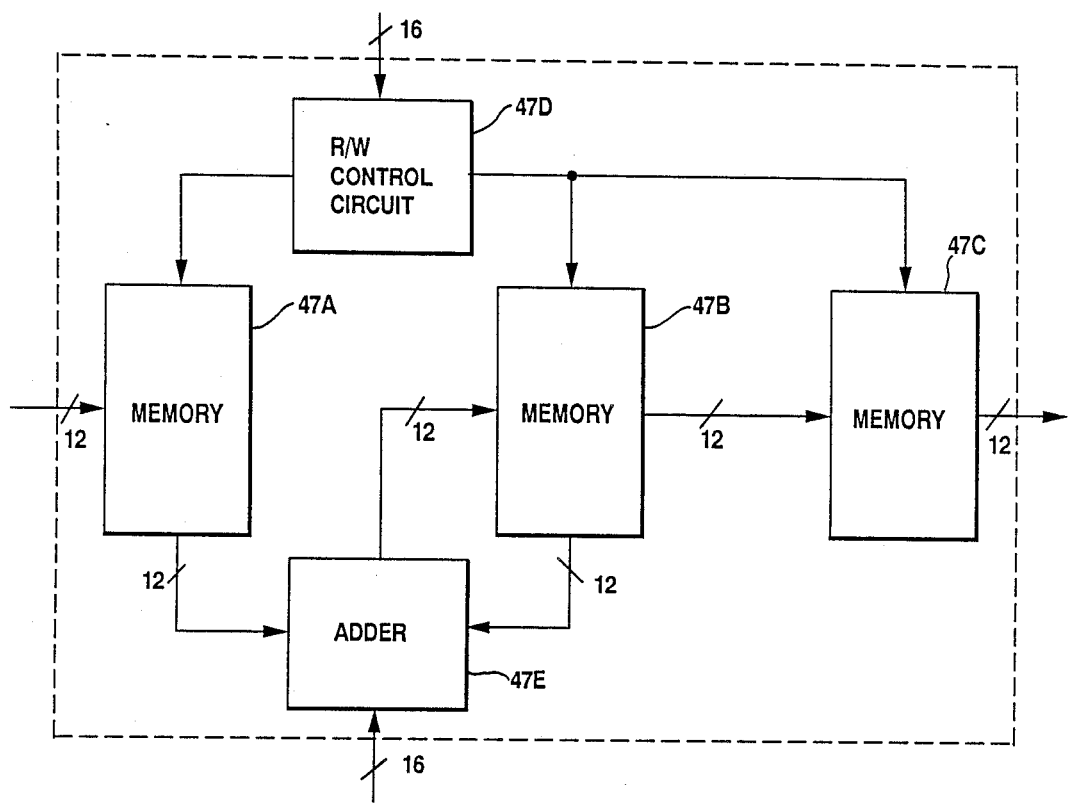
FIG. 7 is a block diagram of an amount memory used in the same receiver.

Incidentally, the amount memory 47 may be also composed as in FIG. 7. That is, possessing two sets of memories 47A, 47B, the content of the buffer 46 is always written into the memory 47, and when one program is finished (that is, when the channel is changed, the end code is detected or the power source is cut off), the content of the memory 47A is added to the content of memory 47B to be stored in memory 47B, and when reading out, the data is taken out of the memory 47B.

Next, the PN key is explained. As mentioned above, the receiver 16 stores 12 bits of the key code. The PN key has 16 bits, of which 12 bits from the least significant bit (LSB) denote the initial value of the PN series and 4 bits from the most significant bit (MSB) indicate how many bits the PN series should be moved from the initial value. By using the 12-bit series obtained by putting the initial value 12 bits indicated by this PN key as the substitute for the initial value of said polynomial formula and shifting by the number indicated by said 4 bits, inversion and noninversion of the video signal are changed over, and the sound signal is operated and processed (the sound is quantized in 12 bits), and the picture and sound are descrambled to the original state.

In other method, meanwhile, the descrambling method of picture and sound may be varied in every 1H by shifting the PN series obtained by putting the initial value of said 12 bits by one bit each at every 1H.

The month, day, and time are stored in the work RAM 37, and may be used appropriately.

Next, supposing to close the accounting one month later or on the 10th day every month, the content of the memory 47B is transferred to the memory 47C (the amount memory 47 is composed of three memories 47A to 47C). It is designed so that the transfer may be effected automatically when the charge display message of FIG. 6 E is received. As the address at this time, either a number common to all terminals (a special number) is used, or one of spares is used as the packet of address "all" at $C_5$. After the charge display message, the key code and amount code are ignored.

When the charge display message is received, the CPU 39 transfers the content of memory 47B in the amount memory 47 into the memory 47C, and writes the content into the luminance memory 49 through the buffer 48 and bus line 40. In this case, since the content of the memory 47C is converted into a numerical pattern by the work ROM 38 and CPU 39 and the numerical pattern is written into the luminance memory 49, its content is read out along with the scanning of electron beam of the CRT 52 and fed to the CRT 53 through buffer amplifier 51, so that the charge is numerically displayed on the CRT. It is sufficient when the buffer amplifier 51 possesses a function to superpose the usual program picture and the charge information, or a function to change over so that only the charge may be displayed. Numeral 50 is an address circuit for applying writing and reading addresses to the luminance memory 49.

At the terminal of a subscriber who does not pay the indicated charge to the bank by, for example, the 20th day of every month, the amount of the address control data after the 21st day is set to zero, and the key code is set to zero, and polling is continued. As a result, when the key code is changed to a new one on the first day of the next month, the data cannot be descrambled at this terminal, and the scrambled picture and sound cannot be received normally.

Or if the paid amount is short, the key code is sent, but when the content of the memory 47C is not zero due to the function of the CPU 39 in the receiver 16, the key code is not taken into the nonvolatile memory 53, so that scrambled picture and sound cannot be descrambled. Or, in the case of pamment shortage, it is extremely easy to indicate the balance to be paid automatically.

An example of charge adjustment operation is explained below by referring to FIG. 4. Counters 43, 44, 45 are CMOS counters (for example, 74LS192), and suppose their inputs and outputs are separately connected to the buffer memory 46. When the data corresponding to the paid amount is sent from the DBS center 11, this data is stored in the work RAM 37. On the other hand, its content is transmitted to the counters 43 to 45 through the buffer amplifier 46 according to the instruction from the CPU 39. In consequence, the charge data in the work RAM 37 is divided by 25-cent increments according to the instruction from the CPU 39, and pulses of integer multiples of 25 cents are fed to the count-down terminal of the counter 43 through the down detection circuit 42, and the contents in the counters 43 to 45 are counted down by the number of said pulses. When all outputs of the counters 43 to 45 become zero, it is designed so that the output of the counters 43 to 45 may not change further. In this state, the outputs of the counters 43 to 45 are written again into the amount memory 47, and if, for instance, the outputs of the counters 43 to 45 are all zero, the key code can be received also in the next month, and if any one of the outputs of the counters 43 to 45 is 1, it is judged that the payment is in shortage, which is indicated on the CRT 52. Therefore, the subscriber should either pay for the shortage or give up the charged program.

In this constitution, thus, even in a unidirectional television such as satellite broadcasting, a charging method for pay television broadcasting can be effected easily, and protection from illegal access may be achieved sufficiently.

The composition of the amount memory 47 is described below in conjunction with FIG. 7, in which memory 47A is for storing the charge of the pay television program viewed to that meoment, and memory 47B is for storing the cumulative total of the charges. As mentioned above, when stopping receiving the program, the charge data of the program is added from the memory 47A to the adder 47E according to the instruction from the write/read control circuit 47D, and is added to the content of the memory 47B, and the added result is newly stored in the memory 47B.

When billing the charge in one month unit, a message indicating the key code for the next month as in FIG. 6 E is detected, and by this detection output, reading from the write/read control circuit 47D into the memory 47B and clearing of its content are instructed, and the content is transferred from memory 47B to memory 47C. The content of memory 47B becomes zero right after it is transferred to the memory 47C, and it begins to store the charge of pay programs of a new month. The write/read control circuit 47D and adder 47E are controlled by specific address in 16 bits of the address signal by the CPU 39.

For prevention of illegal access, meanwhile, part of the program of the content of work ROM 38 may be put into the CPU 39 to be customized, or the work ROM 38 may be divided into two sections and only the address may be set in fuse ROM so that the content of the fuse ROM may be varied for each terminal, or if the program quantity is small, it may be wholly written into the ROM sinde the CPU 39.

Figure 8:
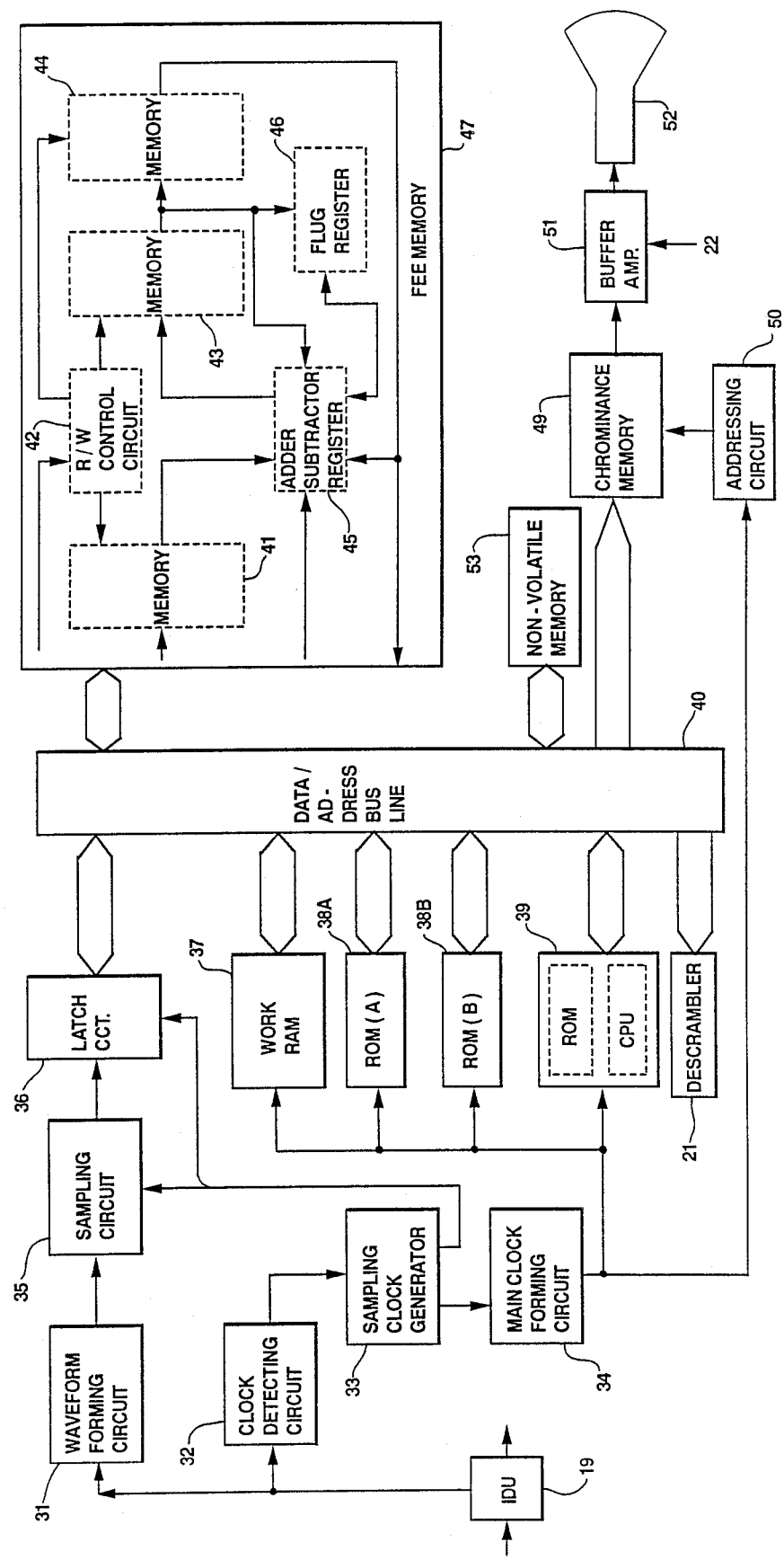
FIG. 8 is a block diagram of a receiver used in a pay television system in a different embodiment.

As a different embodiment, an example of using an amount accounting circuit is shown in FIG. 8.

In this embodiment, every time the charge code varies every 2.5 minutes, the content of the charge memory in the work RAM 37 is added by one bit each (corresponding to 25 cents), and the data of charge information is supplied from the work RAM 37 to the memory 47A in the amount memory 47 to increase the data of the charge memory in the work RAM 37 by the number of bits corresponding to the time of viewing. When the program end data (when all charge codes are "1" or spare code is used), or when the receiving channel is changed, or the power source is cut off, 37 to 47 are temporarily supported by the battery, and the output of the memory 47A (which indicates multiples of 25 cents) is supplied to the addition/subtraction register 47E and added to the content of the memory 47B, and the added result is written again into the memory 47B.

The nonvolatile memory block of amount memory 47 is composed of three memories 47A, 47B, 47C of 12 bits each. If the output of the flag register 47F is "$a_0, a_1, 1$" which indicates addition, the addition/subtraction register 47E performs addition. By supporting the circuits of 37 to 47 by the battery for a short time, the charge information of the work RAM 37 is written into the memory 47A, and the content of memory 47A and the content of memory 47B are added, and the obtained result is written into the memory 47B.

In other method, for example, the charge code of the cumulative amount from the start of a program to a specific moment is sent from the DBS center 11, for example, every 2.5 minutes, and the balance of the first received charge code and the final one is calculated at the terminal X by means of the CPU 39, work ROM 38 and work RAM 37, and is written into the memory 47A, and when the program is over, the content in the memory 47A is added to the content in the memory 47B, and the sum is written into the 47B. In this case, every time the charge code varies, the unit charge is calculated, and multiples of 25 cents are calculated, and the content of the charge memory in the work RAM 37 is increased by the number of multiples, and the increased result is written into the memory 47A every time.

In either method, the content of the memory 47B is increased by one bit each at every time corresponding to the worth of 25 cents.

In another method, the amount memory 47 is composed of, as shown in FIG. 8, nonvolatile RAMS 47A, 47B, 47C of 12 bits each, a the content of the charge memory in the work RAM 37 is written into the memory 47A. When one program is over (that is, when the channel is changed, the end code is detected, or the power source is cut off), the content of the memory 47A is added to the content of the memory 47B to be stored in memory 47B, and when reading out, it is taken out from the memory 47B.

An example of charge settling of this system is shown below. When the data corresponding to the paid charge E is sent from the DBS center 11, this data is stored in the work RAM 37. Prior to this, the content of the memory 47B has been transferred to the memory 47C according to the instruction from the work RAM 37, but the content of the memory 47B until the time of payment includes the amount for the pay programs viewed after the closing of account of the previous month till the data from the DBS center is received, and the content (the numerical value) of the memory 47B is greater than that of the memory 47C.

Accordingly, comparing the data showing the paid charge E in the work RAM 37 and the content in the memory 47C, when the both values are equal, the flag signal of "$a_0$", 1, $a_2$" is provided in the flag register 47F, and when the charge is greater, the flag signal of "1, $a_1$, $a_2$" is provided. The content of the memory 47C and the content of the charge E are subtracted by the register 47E, and a flag is provided by judging the result. Then, similarly comparing the charge E and the content of memory 47B, when the charge E is greater than the content of memory 47B, the flag signal of "$a_0$, $a_1$, 0" is provided, and ever time the pay program is over, the content of the memory 47A and the content of the memory 47B (a negative figure) are compared, and when the content of the memory 47A is greater than the content of the memory 47B, the flag signal of "$a_0$, $a_1$, 1" is provided, so that the portion of overpayment may be assigned for the viewing charge for the next month.

A list of such flag signals is shown in Table 3.

TABLE 3

| $a_0$ | $a_1$ | $a_2$ | Meaning |
|---|---|---|---|
| x | x | 1 | The content of memory 47B is a positive figure. |
| x | x | 0 | The content of memory 47B is a negative figure. |
| x | 1 | x | The content of memory 47C agrees with the paid charge (or is smaller than the paid charge). |
| x | 0 | x | The content of memory 47C is greater than the paid charge (that is, underpayment). |
| 1 | x | x | The content of memory 47C is smaller than the paid charge. |
| 0 | x | x | The content of memory 47C is equal to or greater than the paid charge. |

When the content of memory 47C becomes zero, $a_1=1$ of the flag register 47F is detected, and the CPU 39 takes in a ne key code. When the program is set up so that a new key code will not-be taken in while $a_1=0$, the pay programs of the next month cannot be received unless the charge is paid.

Thus, by this charging method, the pay programs cannot be easily accessed illegally unless the internal composition of the amount register 47 and the content of the work ROM 38 are disclosed. Furthermore, when part or whole of the content in the worm ROM 38 is replaced by the internal ROM in the CPU 39, illegal accessing will be extremely difficult.

Figure 9:
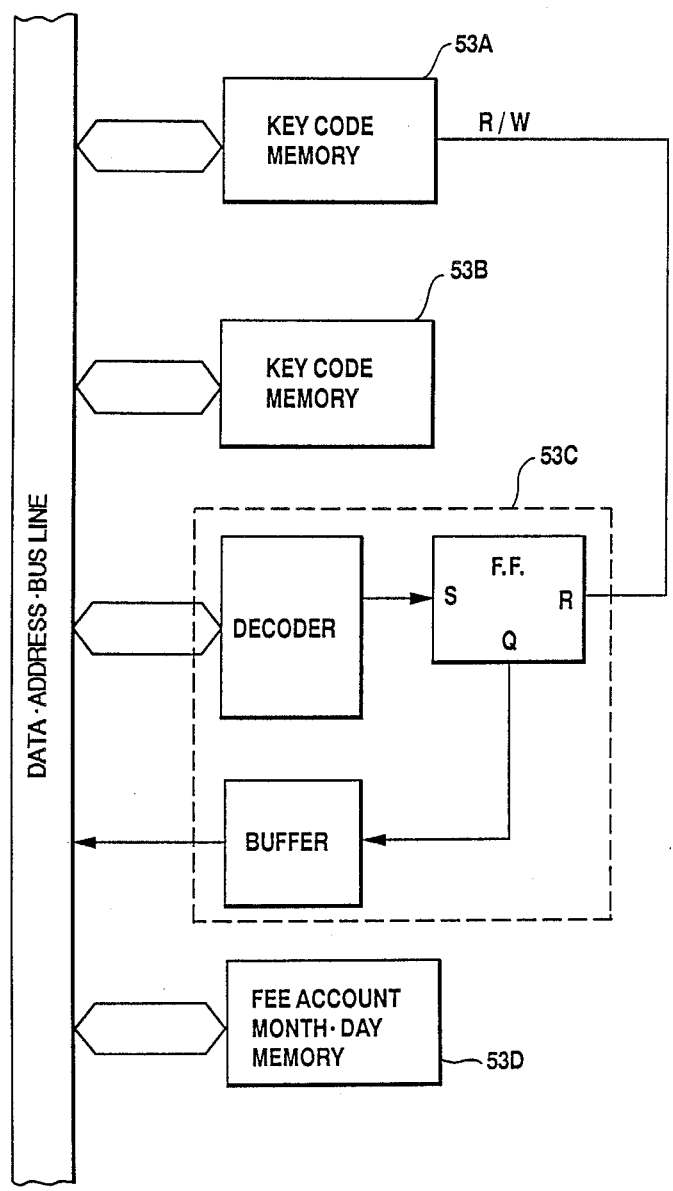
FIG. 9 is a block diagram of key code processing circuit used in the same receiver.

The key code receiving part is described below by referring to FIG. 9. In a newly subscribed terminal receiver, the key of the contemporary month only is received from the 1st to the 20th day of the month. In FIG. 6 E, if the message indicates the key of the contemporary month, signal of underpaid or unpaid notice is not delivered from the charge memory as described above, so that the key code of the contemporary month is written into the nonvolatile memory 53A. At this time, the R/W terminal of memory 53A becomes 0 (low level), and the flip-flop (F.F.) in the memory 53C is cleared, and its Q output is set to 0. After the 20th day of the month, the key code for the next month is sent in, and it is written into the nonvolatile memory 53B. At this time, the F.F. of the memory 53C is set. In the next month, a key code change instruction is sent in, for example, by using part of spare bytes in FIG. 5 C, and according to this instruction, the content of the memory 53B is transferred to the memory 53A in the receiver. While the Q output of the F.F. of memory 53C is at high level, writing to the memory 53B is not effected.

Since the CPU 39 descrambles the received signals by using always the key code stored in the memory 53A, when a new month starts, the operation is stopped unless the R/W terminal of memory 53A is 0 and the Q output of the F.F. of memory 53C is 0, and the message is displayed in the CRT 52 (this point is discussed later).

When a newly subscribed terminal receiver is installed somewhere between the 21st day and the end of a month, it receives the keys of the month and the next month. The key of the contemporary month is written in the memory 53A, and the key of the next month, in 53B. From the DBS center 11, the key of the contemporary month is submitted first, and polling is effected later. Since the R/W terminal of memory 53A becomes 0 the F.F. of memory 53C is cleared, bet when the key of the next month sent later is received, the F.F. of memory 53C is set.

In the next month, according to said key code change instruction, the content of the memory 53B is transferred to the memory 53A. At this time, the R/W terminal of memory 53A becomes 0. Thereafter, the Q of F.F. of 53C becomes 1 only between the 21st day and the end of a month.

If the power source is cut off on the way, the content is protected the memory 53 is composed of nonvolatile memory. If the power is cut off for a long periodor if the Q output of F.F. of memory 53C remains "1" due to some reason, the screen does not return to normal picture is descrambled by using the content of the memory 53A, and when the receiver button is operated to the information to check to the CPU 39, the Q output of memory 53C or the content of memory 53D which is described later is checked, and the message meaning "Request the key code to the DBS center" appears on the CRT 52.

Or, it is also possible to display the same message automatically by comparing the content of the memory 53D and the content in FIG. 5 C and judging if the content of memory 53A is correct or not.

The role of the memory 53D is described below. This is a memory to store the date of updating the content of amount memory 47 after receiving the paid charge, and the message code at that time. When four kinds of charge clear message in FIG. 6 E are prepared as shown in FIG. 7, and the view (the end user) pays the same amount as the charge displayed on the CRT 52 to a specified bank, it is noticed to the DBS center 11, and the charge clear information among the message codes in FIG. 6 and the amount are sent in from the DBS center 11 as stated above. If this amount is same as the content of the memory 44 above, the unpaid charge is canceled to zero, and normal reception in the next month is guaranteed. In the memory 53D, the charge clear code A in FIG. 7 and the date of the first reception are stored. The clear code A is sent out at least several times. If the charge is underpaid, the balance is displayed.

If the insufficient portion of the charge is paid in, the amount code is sent from the DBS center 11 together with the charge clear code B. Then, at the receiver, the content of the memory 53D (date and type of clear message) is compared with the date of reception and type of clear message, and only when the type of clear message differs, the charge information of the memory content in the amount memory 47 is updated. If the content of the memory 44 does not become zero if updated, the charge shortage message is displayed again. At this time, the clear code B sent later and its data are stored in the memory 53D. By preparing two or more types of clear code and storing the code together with the date, malfunction of updating the content of the amount memory 47 more than twice if the clear code once received is sent in repeatedly as shown in the example above.

In this construction, malfunction does not occur if the charge is paid in divided portions, and the key code can be easily changed every month.

Prevention of illegal access is described in details. The simplest way is to assign each terminal with 24-bit operation data, and write it into the ROM 38A, together with address number 28 bits, in a specified rule. The worm ROM 38A should vary at each terminal. By storing the program to correctly read the address and operation data in the work ROM 38A into the program ROM in the CPU 39, the address and operation data are read out from the ROM 38A by the CPU 39 and stored in part of the work ROM 37. In this case, it is sufficient if there are about 1,000 types of operation data.

As the operation of the receiver, it is necessary to receive the address code of the terminal x in order to make the terminal valid. As the polling, which is described below, suppose the address of the terminal x and the key of the contemporary month as in FIG. 6 are sent in. The coincidence of the address codes is judged by the internal program of the CPU 39, and since the address in the ROM 38A cannot be read out easily without the medium of CPU 39 as mentioned above, a second means of security to protect from illegal access is effected in this stage. Then, finding the exclusive OR of the key code of the contemporary month in FIG. 6 E and the above operation date, it is set as $C_0$ to $C_{23}$ in FIG. 10 F2. The 12 bits from $C_0$ to $C_{11}$ are said key codes. The operation is not limited to exclusive OR, and the same effect will be obtained by shifting the data by the number of times determined, with $b_0$ to $b_{23}$ in FIG.

6 E set as the initial value, as the coefficient of polynomial formula. by obtaining the key code by arithmetic opeation, a third means of security is effected. By this key code and the keyword in FIG. 5 C, the picture and sound are descrambled. If the picture is inverted pseudorandomly in the field unit and the sound is digitized, illegal descrambling is next to impossible. When the inversion or noninversion of picture is determined by the key code, it changes every moment, and illegal access is impossible.

Or when the ROM 38A is designed to be replaceable by the socket, the address of the terminal may be easily changed in the event of trouble.

What is claimed is:

1. A pay televison system comprising: a means for tr ansmitting and receiving a charge code corresponding to the content of a program transmitted in a unidirectional television system, said charge code being in the form of digital coded signals which are transmitted a plurality of times throughout an entire period of each broadcast program at specified time intervals and a content of said charge code being changed at predetermined time intervals; a means for accounting an amount in an accounting circuit within a receiver according to the number of changes of said received charge code; a means for writing charge data proportional to this amount into a memory; and a means for reading out charge data stored in said m ®mory when necessary and for displaying said stored charge data on a display means.

2. A pay television system as set forth in claim 1, wherein said memory is a nonvolatile memory.

3. A pay television system as set forth in claim 1, further comprising: a means for transmitting paid charge information sent out from a televison program transmission side to said receiver into a memory; a means for comparing said paid charge information and a charge data in said memory, said charge data in said memory representing an accrued amount of charges from a last payment, andaa means for storing a new key code sent form said transmission side only when both of said pad charge information amounts and said charge data amounts are equal or when said pad charge inforamtion amounts sent from said transmission side is greater than said charge data amount stored in said memory.

4. A pay television system as set forth in claim 3, wherein said memory is a nonvolatile memory.

5. A pay television system as set forth in claim 1, further comprising, with said memory being divided into three sections: a means for storing charge data proportional to the number of changes of said received charge code of every program in a first memory; a means for adding the content stored in said first memory to the content of a second memory when a program is over, when power is cut off, when the channel is changed, or when reception of a pay program is otherwise over; a means for trenasferring and storing the content stored in said second memory to a third memory when receiving a charge display instruction code sent form a television program transmission side, and a means for comparing received data with the content of said second o third memory when said received data corresponds to paid charge inforamtion individually sent to said receiver from said transmission side, and for clearing the content of said second and third memories when both values are equal or when the content of asid second or third memory is smaller than said received data, or for storing the difference in said second and third memories when said received data is smaller than the content of the second or third memory and for displaying this different amount.

6. A pay television system as set forth in claim 5, wherein said first, second and third memories are non-volatile memories.

7. A pay television system as set forth in claim 5, further comprising a means for rejecting acceptance of new descrambling information at said receiver sent from the transmission side when said receivied data is smaller than the content stored in said third memory of said receiver.

8. A pay television system as set forth incalim 5, further comprsiing: a means for comparing said received data and the content stored in said second memory; a means for storing the differene between said recevied data and said content of said second memory in said second memory when the former content of said second memory is greater than the latter content thereof and for providing a flag signal when said differnece is stored in said second memory, and a means for adding the content of said first memory as a negative number to the control of said second memory when transferring the content of said first memory into said second memory during a certain period of said flag signal and storing the result in said second memory.

9. A pay television system as set forth in claim 1, wherein a memory for storing charging data and a memory for storing a key code signal for descrambling a scrambled video signal and sound signal are individually provided, and as the key code signal memory, a first memory stores a presently valid key code and a second memory stores a key code signal which becomes valid in the future; said system further comprising: a means for writing a key code signal consecutively sent from the transmissionside once in said key code signal memory; a memory for storing data when the content of a charge information memory is renewed according to the charge information of an individual terminal sent from the transmission side and a flag to indicate a type of the charge inforamtion at that time, and a thrid memroy for storing an indication taht a content of said seocnd memory was transferred into said first memory in accordance with the key code signal change signal from the transmission side.

10. A pay television system as set forth in claim 9, wherein said memories are all nonvolatile memories.

11. A pay television system as set forth in claim 9, wherein a means is provided for storinq information in said third memory whne different key code signals are simulataneously stored in said first and second memories, said information being the same as information stored in said third memory when the data is transferred from said second memory to said first memory.

12. A pay television system as set forth in claim 1, wherein an individiual address assigned to said receiver is scrambled by a first scrambling method and stored in said memory, and information for descrambling the terminal key code, scrambled by a secodn scrambling method which is sent from the television program transmission side, is scrambled by said first scrambling method and stored in said memory, and a program for descramling said first scrambling method is stored in said memory on a chip of a microprocessor used for main control.

13. A pay television system as set forth in claim 12, wherein an address and information for descrambling the terminal key code are stored in one memory which is detachably connected to said system by means of a socket.

* * * * *